(12) United States Patent
Sumasu (10) Patent No.: US 10,826,421 B2
(45) Date of Patent: Nov. 3, 2020

(54) MOTOR CONTROL DEVICE

(71) Applicant: JTEKT CORPORATION, Osaka (JP)

(72) Inventor: Hiroshi Sumasu, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/703,258

(22) Filed: Sep. 13, 2017

(65) Prior Publication Data

US 2018/0091080 A1 Mar. 29, 2018

(30) Foreign Application Priority Data

Sep. 26, 2016 (JP) ................................. 2016-187417

(51) Int. Cl.
| | | |
|---|---|---|
| *H02P 21/22* | (2016.01) | |
| *H02P 21/00* | (2016.01) | |
| *H02P 21/16* | (2016.01) | |
| *H02P 25/03* | (2016.01) | |
| *H02P 21/18* | (2016.01) | |
| *H02P 6/10* | (2006.01) | |
| *H02P 25/026* | (2016.01) | |
| *H02P 27/12* | (2006.01) | |

(Continued)

(52) U.S. Cl.
CPC ................. *H02P 21/22* (2016.02); *H02P 6/10* (2013.01); *H02P 21/0085* (2013.01); *H02P 21/16* (2016.02); *H02P 21/18* (2016.02); *H02P 25/026* (2013.01); *H02P 25/03* (2016.02); *H02P 27/12* (2013.01); *B62D 5/008* (2013.01); *B62D 5/0454* (2013.01); *H02P 2205/05* (2013.01)

(58) Field of Classification Search
CPC ........ H02P 6/21; H02P 2209/09; H02P 27/08; H02P 21/00; B62D 5/046
See application file for complete search history.

(56) References Cited

U.S. PATENT DOCUMENTS

| | | | | |
|---|---|---|---|---|
| 6,694,238 B2 * | 2/2004 | Ishihara | ............... | B62D 5/0463 |
| | | | | 180/6.2 |
| 9,602,040 B2 * | 3/2017 | Takahashi | ............... | H02P 27/08 |
| (Continued) | | | | |

FOREIGN PATENT DOCUMENTS

| | | |
|---|---|---|
| EP | 2234266 A1 | 9/2010 |
| EP | 2262098 A1 | 12/2010 |
| | (Continued) | |

OTHER PUBLICATIONS

Feb. 19, 2018 Extended Search Report issued in European Patent Application No. 17192091.1.

(Continued)

*Primary Examiner* — Bickey Dhakal
(74) *Attorney, Agent, or Firm* — Oliff PLC (57) ABSTRACT

A microcomputer includes a current command value setting unit configured to set a two-phase current command value in a two-phase rotating coordinate system for each of PWM cycles in a current control cycle, and an open-loop control unit configured to calculate a two-phase voltage command value for each of the PWM cycles, according to a motor voltage equation, based on the two-phase current command value for each of the PWM cycles that is set by the current command value setting unit and a rotation speed of an electric motor. The two-phase voltage command value is a command value of voltage that is to be applied to the electric motor.

6 Claims, 6 Drawing Sheets

(51) Int. Cl.
*B62D 5/00* (2006.01)
*B62D 5/04* (2006.01)

(56) References Cited

U.S. PATENT DOCUMENTS

| | | | | |
|---|---|---|---|---|
| 9,774,284 | B2* | 9/2017 | Liu | H02P 6/18 |
| 2008/0191655 | A1 | 8/2008 | Ueda et al. | |
| 2008/0203958 | A1* | 8/2008 | Suzuki | B62D 5/046 |
| | | | | 318/629 |
| 2009/0079373 | A1* | 3/2009 | Nagase | B62D 5/0487 |
| | | | | 318/400.22 |
| 2009/0237014 | A1* | 9/2009 | Yamada | H02P 21/16 |
| | | | | 318/400.02 |
| 2009/0256503 | A1* | 10/2009 | Ueda | H02P 6/06 |
| | | | | 318/400.02 |
| 2010/0045217 | A1* | 2/2010 | Ueda | B62D 5/046 |
| | | | | 318/400.02 |
| 2011/0025238 | A1* | 2/2011 | Ueda | B62D 5/046 |
| | | | | 318/400.02 |
| 2011/0214934 | A1* | 9/2011 | Ueda | B62D 5/046 |
| | | | | 180/446 |
| 2011/0241586 | A1* | 10/2011 | Tobari | H02P 21/06 |
| | | | | 318/400.23 |
| 2013/0099707 | A1* | 4/2013 | Okubo | H02P 6/10 |
| | | | | 318/400.23 |

FOREIGN PATENT DOCUMENTS

| | | |
|---|---|---|
| EP | 3000649 A1 | 3/2016 |
| JP | H01-50766 A | 2/1989 |
| JP | 2001-333591 A | 11/2001 |
| JP | 2008-220155 A | 9/2008 |

OTHER PUBLICATIONS

Jun. 25, 2020 Office Action issued in Japanese Patent Application No. 2016-187417.

* cited by examiner

MOTOR CONTROL DEVICE

INCORPORATION BY REFERENCE

The disclosure of Japanese Patent Application No. 2016-187417 filed on Sep. 26, 2016 including the specification, drawings and abstract is incorporated herein by reference in its entirety.

BACKGROUND OF THE INVENTION

1. Field of the Invention

The invention relates to a motor control device configured to drive an electric motor through pulse-width modulation (PWM) control.

2. Description of the Related Art

In a motor control device configured to execute vector control of a three-phase electric motor, a two-phase current command value is calculated in each current control cycle. Based on the deviation between the two-phase current command value and a two-phase current detected value, a two-phase voltage command value is calculated. The two-phase voltage command value is subjected to two-phase-to-three-phase conversion based on a rotation angle of the electric motor, so that a U-phase voltage command value, a V-phase voltage command value, and a W-phase phase voltage command value (hereinafter, collectively referred to as "three-phase voltage command value" where appropriate) are calculated. A U-phase PWM signal, a V-phase PWM signal, and a W-phase PWM signal having duty ratios respectively corresponding to the U-phase voltage command value, the V-phase voltage command value, and the W-phase phase voltage command value are generated, and are then provided to a three-phase inverter circuit.

Power elements constituting the inverter circuit are controlled according to the U-phase PWM signal, the V-phase PWM signal and the W-phase PWM signal. Thus, a voltage corresponding to the three-phase voltage command value is applied to the electric motor. As a result, a motor current to be passed through the electric motor is controlled so as to be equal to the two-phase current command value (see Japanese Unexamined Patent Application Publication No. 1-50766 (JP 1-50766 A)).

In the motor control device configured to execute the vector control of the three-phase electric motor, when the frequency (PWM frequency) of PWM signals is set to a high frequency, it is possible to appropriately apply motor voltages, thereby smoothly rotating the motor even in a system in which the motor rotation speed (number of revolutions) is high. However, when the PWM frequency is set to a high frequency, the cycle (PWM cycle) of the PWM signals becomes shorter than the current control cycle in some cases. When the PWM cycle is shorter than the current control cycle, a plurality of PWM cycles are included in a current control cycle.

As the motor control device, there has been proposed a motor control device configured to vary the current command value for each rotation angle of the electric motor in order to compensate for a torque ripple. However, in a commonly-used feedback control, a current command value is set for each current control cycle. Therefore, when a plurality of PWM cycles is included in a current control cycle, it is difficult to vary the current command value for each PWM cycle. In order to achieve current feedback control for each PWM cycle, it is necessary to execute a current detection process for each PWM cycle. This makes it difficult to execute calculation within an appropriate calculation time.

SUMMARY OF THE INVENTION

One object of the invention is to provide a motor control device configured to execute current control through which a current command value is varied for each PWM cycle even when a plurality of PWM cycles is included in a current control cycle.

An aspect of the invention relates to a motor control device configured to control an electric motor based on a PWM signal generated for each of a plurality of PWM cycles included in a current control cycle. The motor control device includes a motor rotation angle estimating unit, a two-phase current command value setting unit, an open-loop control unit, and a PWM control unit. The motor rotation angle estimating unit is configured to estimate a rotation angle of the electric motor for each of the PWM cycles in the current control cycle. The two-phase current command value setting unit is configured to set a two-phase current command value in a two-phase rotating coordinate system for each of the PWM cycles in the current control cycle. The open-loop control unit is configured to calculate a two-phase voltage command value for each of the PWM cycles, according to a motor voltage equation, based on the two-phase current command value for each of the PWM cycles that is set by the two-phase current command value setting unit and a rotation speed of the electric motor. The two-phase voltage command value is a command value of voltage that is to be applied to the electric motor. The PWM control unit is configured to generate a PWM signal for each of PWM cycles in a given current control cycle, based on a two-phase voltage command value generated for the given current control cycle by the open-loop control unit and a rotation angle of the electric motor for each of the PWM cycles in the given current control cycle estimated by the motor rotation angle estimating unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
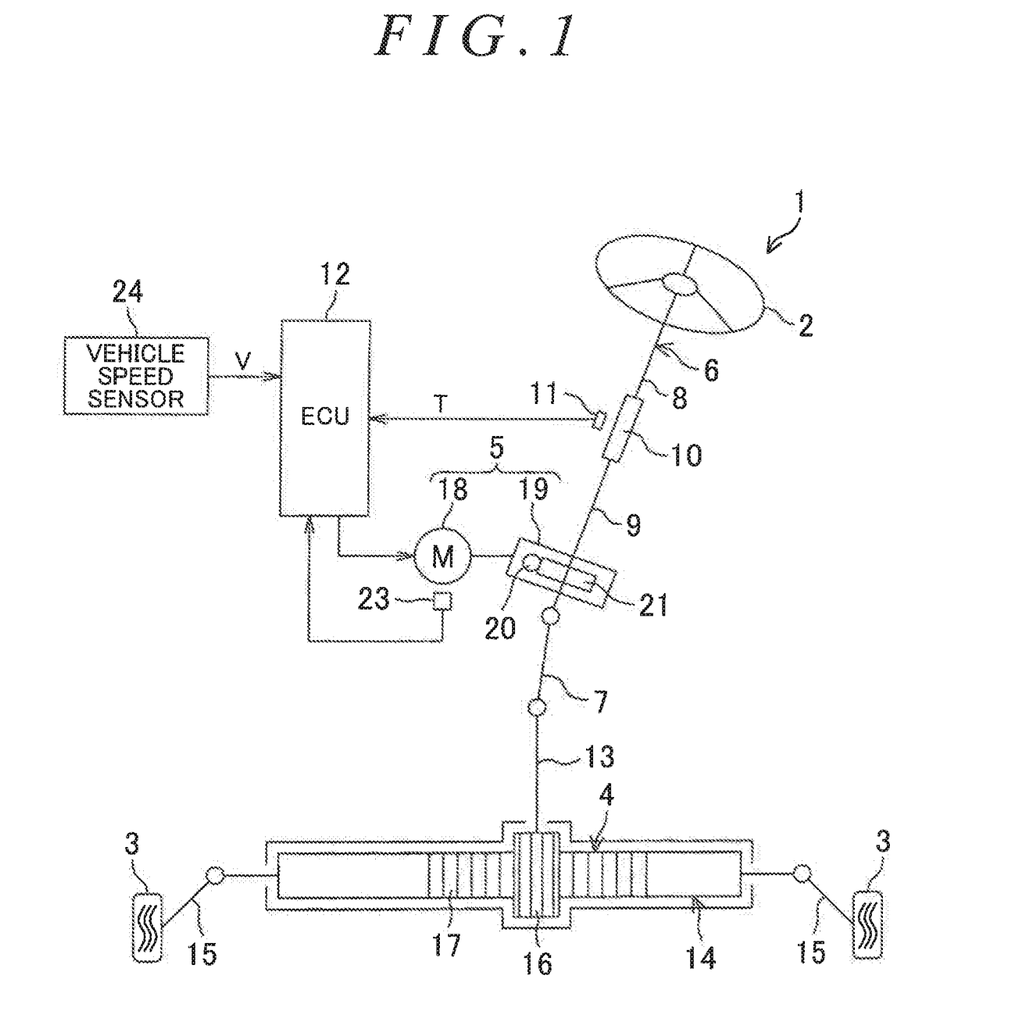
FIG. 1 is a diagram schematically illustrating the configuration of an electric power steering system according to an embodiment of the invention.

Hereinafter, example embodiments in which the invention is applied to an electric power steering system will be described in detail with reference to the accompanying drawings. FIG. 1 is a diagram schematically illustrating the configuration of an electric power steering system provided with a motor control device according to an embodiment of the invention. An electric power steering system (EPS: Electric Power Steering) 1 includes a steering wheel 2, a steering operation mechanism 4, and a steering assist mechanism 5. The steering wheel 2 is a steering member for steering a vehicle. The steering operation mechanism 4 steers steered wheels 3 in response to the rotation of the steering wheel 2. The steering assist mechanism 5 assists a driver in performing a steering operation. The steering wheel 2 and the steering operation mechanism 4 are mechanically coupled to each other via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are coupled to each other via a torsion bar 10, in a relatively rotatable manner. A torque sensor 11 is disposed near the torsion bar 10. The torque sensor 11 detects a steering torque T applied to the steering wheel 2, based on a relative rotational displacement between the input shaft 8 and the output shaft 9. In the present embodiment, as for the steering torque T detected by the torque sensor 11, for example, a torque for steering the vehicle to the right is detected as a positive value, and a torque for steering the vehicle to the left is detected as a negative value. As the absolute value of the steering torque T is greater, the magnitude of the steering torque is higher.

The steering operation mechanism 4 is a rack-and-pinion mechanism including a pinion shaft 13 and a rack shaft 14, which is a steered shaft. The steered wheels 3 are coupled to respective ends of the rack shaft 14 via tie rods 15 and knuckle arms (not illustrated). The pinion shaft 13 is coupled to the intermediate shaft 7. The pinion shaft 13 rotates in response to the steering operation of the steering wheel 2. A pinion 16 is coupled to a distal end (lower end in FIG. 1) of the pinion shaft 13.

The rack shaft 14 linearly extends in the lateral direction of the vehicle. A rack 17 engaged with the pinion 16 is provided at an intermediate portion of the rack shaft 14 in its axial direction. The pinion 16 and the rack 17 convert the rotation of the pinion shaft 13 into an axial motion of the rack shaft 14. The steered wheels 3 are steered as the rack shaft 14 is moved in the axial direction.

When the steering wheel 2 is steered (rotated), the rotation is transmitted to the pinion shaft 13 through the steering shaft 6 and the intermediate shaft 7. The rotation of the pinion shaft 13 is converted into an axial motion of the rack shaft 14 by the pinion 16 and the rack 17. Thus, the steered wheels 3 are steered. The steering assist mechanism 5 includes an electric motor 18 for steering assist, and a speed reduction mechanism 19 configured to transmit the torque output from the electric motor 18 to the steering operation mechanism 4. The electric motor 18 is provided with a rotation angle sensor 23 configured to detect a rotation angle of a rotor of the electric motor 18. The rotation angle sensor 23 may be, for example, a resolver. The speed reduction mechanism 19 is a worm gear mechanism including a worm shaft 20 and a worm wheel 21 engaged with the worm shaft 20.

The worm shaft 20 is driven to be rotated by the electric motor 18. The worm wheel 21 is coupled to the steering shaft 6 so as to be rotatable together with the steering shaft 6 in an integrated manner. The worm wheel 21 is driven to be rotated by the worm shaft 20. When the worm shaft 20 is driven to be rotated by the electric motor 18, the worm wheel 21 is driven to be rotated, so that the steering shaft 6 rotates. The rotation of the steering shaft 6 is transmitted to the pinion shaft 13 through the intermediate shaft 7. The rotation of the pinion shaft 13 is converted into an axial motion of the rack shaft 14. Thus, the steered wheels 3 are steered. That is, the worm shaft 20 is driven to be rotated by the electric motor 18, whereby the steered wheels 3 are steered.

The vehicle is provided with a vehicle speed sensor 24 configured to detect a vehicle speed V. The steering torque T detected by the torque sensor 11, the vehicle speed V detected by the vehicle speed sensor 24, the output signal from the rotation angle sensor 23 and so forth are input into an electronic control unit (ECU) 12. The ECU 12 controls the electric motor 18 based on the input signals.

Figure 2:
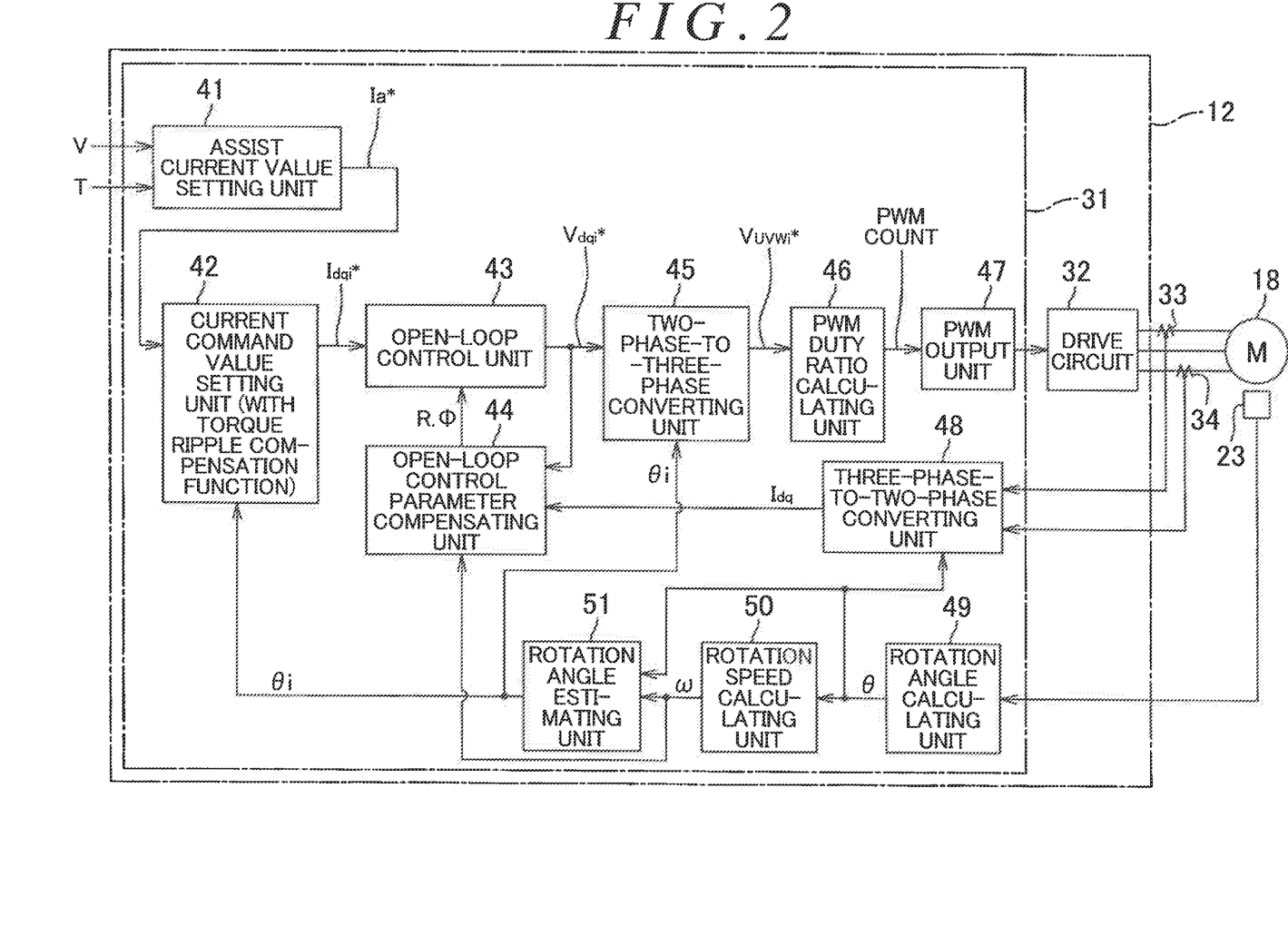
FIG. 2 is a block diagram illustrating the electrical configuration of an electronic control unit (ECU)

FIG. 2 is a block diagram illustrating the electrical configuration of the ECU 12. The ECU 12 includes a microcomputer 31 and a drive circuit (inverter circuit) 32 configured to supply electric power to the electric motor 18 under the control of the microcomputer 31. Two current sensors 33, 34 are provided on electric power supply lines that connect the drive circuit 32 to the electric motor 18. The current sensors 33, 34 are provided so as to detect phase currents that flow through two electric power supply lines from among the three electric power supply lines that connect the drive circuit 32 to the electric motor 18.

Figure 3:
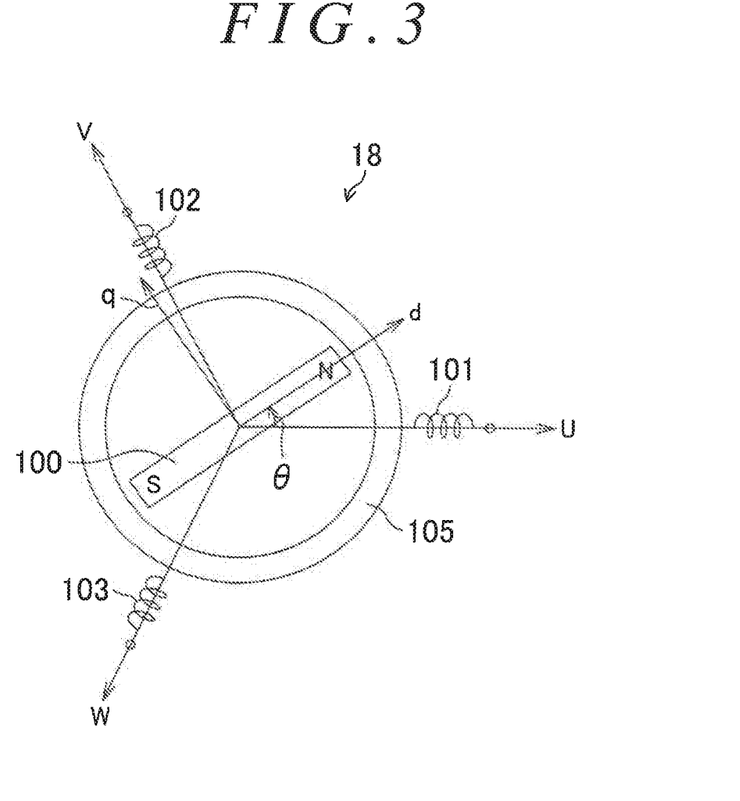
FIG. 3 is a diagram schematically illustrating the configuration of an electric motor.

The electric motor 18 is, for example, a three-phase brushless motor. As schematically illustrated in FIG. 3, the electric motor 18 includes a rotor 100 as a field magnet, and a stator 105 provided with a U-phase stator coil 101, a V-phase stator coil 102, and a W-phase stator coil 103. A three-phase fixed coordinate system (UVW coordinate system) in which a U-axis, a V-axis and a W-axis are respectively set to the directions of the stator coils 101, 102, 103 is defined. A two-phase rotating coordinate system (dq coordinate system, actual rotating coordinate system) in which a d-axis (magnetic pole axis) is set to the magnetic pole direction of the rotor 100 and a q-axis (torque axis) is set to the direction orthogonal to the d-axis on a rotational plane of the rotor 100 is defined. In the dq coordinate system, only a q-axis current contributes to torque generation by the rotor 100. Therefore, a d-axis current is set to zero, whereas the q-axis current is controlled based on a desired torque. A rotation angle (electric angle) θ of the rotor 100 is the rotation angle of the d-axis with respect to the U-axis. The dq coordinate system is an actual rotating coordinate system corresponding to the rotor rotation angle θ. Based on the rotor rotation angle θ, it is possible to execute coordinate conversion between the UVW coordinate system and the dq coordinate system.

Referring back to FIG. 2, the microcomputer 31 includes a central processing unit (CPU) and memories (e.g., a ROM, a RAM, and a non-volatile memory). The microcomputer 31 executes prescribed programs, thereby functioning as a plurality of function processing units. The function processing units include an assist current value setting unit 41, a current command value setting unit 42, an open-loop control unit 43, an open-loop control parameter compensating unit 44, a two-phase-to-three-phase converting unit 45, a PWM duty ratio calculating unit 46, a PWM output unit 47, a three-phase-to-two-phase converting unit 48, a rotation angle calculating unit 49, a rotation speed calculating unit 50, and a rotation angle estimating unit 51.

Figure 4:
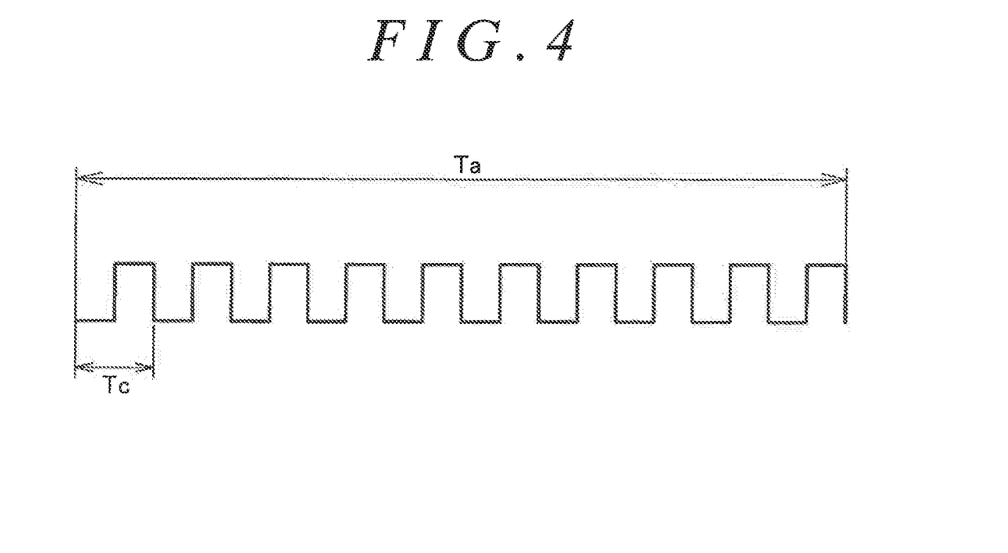
FIG. 4 is a diagram schematically illustrating the relationship between a cycle Tc of a PWM signal and a current control cycle Ta.

As illustrated in FIG. 4, a cycle Tc of a PWM signal (hereinafter, referred to as "PWM cycle Tc") is shorter than a current control cycle Ta. In the present embodiment, the PWM cycle Tc is 1/10 of the current control cycle Ta. In other words, ten PWM cycles Tc are included in one current control cycle Ta. The first cycle of the ten PWM cycles Tc will be referred to as the 1st cycle. The subsequent cycles will be referred to as the 2nd, 3th, . . . , 9th and 10th cycles in some cases. Further, the cycle number of a PWM cycle will be denoted by i (i=1, 2, . . . , 9, 10).

Referring back to FIG. 2, the rotation angle calculating unit 49 calculates a rotation angle (electric angle) θ of the rotor of the electric motor 18 for each current control cycle Ta, based on an output signal from the rotation angle sensor 23. The rotor rotation angle θ calculated by the rotation angle calculating unit 49 is provided to the three-phase-to-two-phase converting unit 48, the rotation speed calculating unit 50, and the rotation angle estimating unit 51. In the present embodiment, the timing at which the rotor rotation angle θ is acquired (detected) is the middle of the current control cycle Ta.

The rotation speed calculating unit 50 calculates a rotation speed (angular speed) ω of the rotor of the electric motor 18, by executing temporal differentiation on the rotor rotation angle θ calculated by the rotation angle calculating unit 49. The rotation speed ω calculated by the rotation speed calculating unit 50 is provided to the rotation angle estimating unit 51 and the open-loop control parameter compensating unit 44. The rotation angle estimating unit 51 estimates a rotor rotation angle θi (i=1, 2, . . . , 9, 10) at the start point of each PWM cycle Tc included in the next current control cycle Ta, based on the rotor rotation angle θ acquired in the immediately preceding current control cycle Ta, according to Equation (1).

$$\theta 1 = \theta + \omega \cdot (3/2) \cdot Ta$$

$$\theta 2 = \theta 1 + \omega \cdot Tc$$

$$\theta 3 = \theta 3 = \omega \cdot Tc$$

$$\theta 9 = \theta 8 + \omega \cdot Tc$$

$$\theta 10 = \theta 9 + \omega \cdot Tc \qquad \text{Equation (1)}$$

The rotor rotation angle θi (i=1 to 10) estimated by the rotation angle estimating unit is provided to the current command value setting unit 42 and the two-phase-to-three-phase converting unit 45.

The three-phase-to-two-phase converting unit 48, first, calculates a U-phase current $I_U$, a V-phase current $I_V$, and a W-phase current $I_W$ (hereinafter, collectively referred to as "three-phase detected current $I_{UVW}$" where appropriate), from the phase currents for two phases detected by the current sensors 33, 34. Then, the three-phase-to-two-phase converting unit 48 executes coordinate conversion from the three-phase detected current $I_{UVW}$ in the UVW coordinate system to a two-phase detected current $I_{dq}$ in the dq coordinate system. The two-phase detected current $I_{dq}$ includes a d-axis detected current $I_d$ and a q-axis detected current $I_q$. In the coordinate conversion, the rotor rotation angle θ calculated by the rotation angle calculating unit 49 is used.

Figure 5:
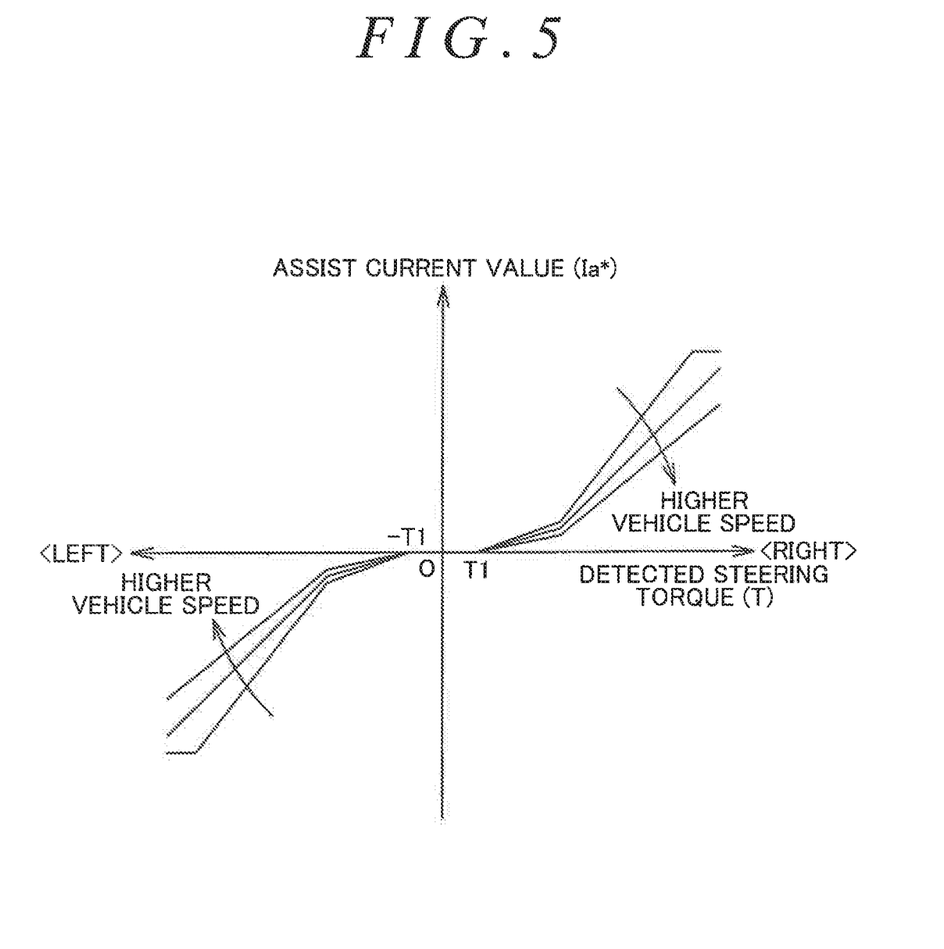
FIG. 5 is a graph illustrating an example of how to set an assist current value Ia* with respect to a detected steering torque T.

The assist current value setting unit 41 sets an assist current value (base current command value) Ia* for each current control cycle Ta, based on a steering torque T detected by the torque sensor 11 and the vehicle speed V detected by the vehicle speed sensor 24. FIG. 5 illustrates an example of how to set an assist current value Ia* with respect to the detected steering torque T. As for the steering torque T, for example, a torque for steering the vehicle to the right is detected as a positive value, and a torque for steering the vehicle to the left is detected as a negative value. The assist current value Ia* takes a positive value when the electric motor 18 generates a steering assist force for steering the vehicle to the right, and takes a negative value when the electric motor 18 generates a steering assist force for steering the vehicle to the left. The assist current value Ia* takes a positive value when the detected steering torque T takes a positive value, and takes a negative value when the detected steering torque T takes a negative value.

When the detected steering torque T takes a very small value within a range (torque dead zone) from −T1 to T1 (for example, T1=0.4 N·m), the assist current value Ia* is set to zero. When the detected steering torque T takes a value outside the range from −T1 to T1, the assist current value Ia* is set such that the absolute value of the assist current value Ia* is greater as the absolute value of the detected steering torque T is greater. The assist current value Ia* is set such that the absolute value of the assist current value Ia* is smaller as the vehicle speed V detected by the vehicle speed sensor 24 is higher. Thus, the steering assist force is larger when the vehicle is traveling at a lower speed, and the steering assist force is smaller when the vehicle is traveling at a higher speed.

Figure 6A:
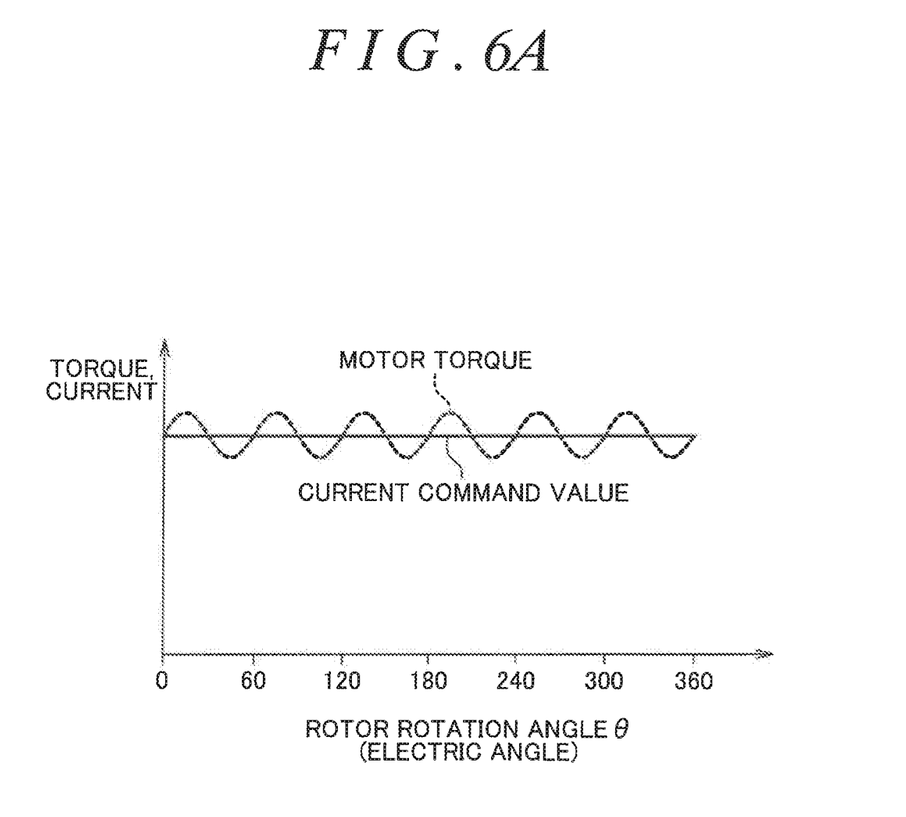
FIG. 6A is a time-series chart illustrating a variation in torque when a current command value is constant.
Figure 6B:
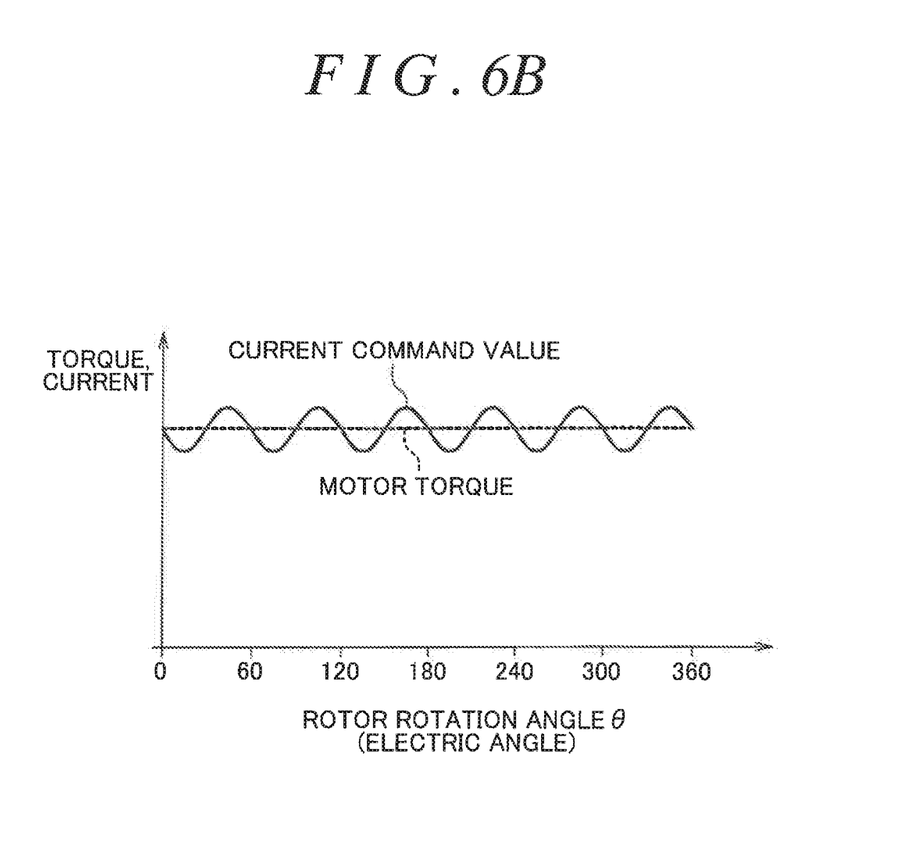
FIG. 6B is a time-series chart illustrating a variation in torque when a current command value for generating torque that cancels out a torque ripple is generated based on a rotor rotation angle.

The current command value setting unit 42 sets a value of current to be passed through the coordinate axis of the dq coordinate system, for each PWM cycle Tc, as a current command value. The current command value setting unit 42 has a torque ripple compensation function, and sets a current command value that allows compensation of a torque ripple. When the current command value is constant, for example, a sine-wave torque ripple illustrated in FIG. 6A is generated. The torque ripple cyclically varies depending on the rotor rotation angle θ. As illustrated in FIG. 6B, a current command value for generating torque that cancels out a torque ripple is generated based the rotor rotation angle θ. Thus, it is possible to compensate for the torque ripple.

The current command value setting unit 42 sets, as a current command value, a value of current to be passed through the coordinate axis of the dq coordinate system in each PWM cycle Tc in the next current control cycle Ta, based on the assist current value Ia* and the rotor rotation angle θi (θ1 to θ10) corresponding to each PWM cycle Tc in the next current control cycle Ta, which is estimated by the rotation angle estimating unit 51 in the present current control cycle Ta. Specifically, the current command value setting unit 42 sets a d-axis current command value $I_{di}$*(i=1 to 10) and a q-axis current command value $I_{qi}$*(i=1 to 10), for each rotor rotation angle θi (i=1 to 10). Hereinafter, the d-axis current command value $I_{di}$* and the q-axis current command value $I_{qi}$* will be collectively referred to as a two-phase current command value $I_{dqi}$*(i=1 to 10) where appropriate.

Specifically, the current command value setting unit 42, first, sets the assist current value Ia* set by the assist current value setting unit 41, as a base q-axis current command value, and sets zero as a base d-axis current command value. The current command value setting unit 42 sets, as the q-axis current command value $I_{qi}$*, a value obtained by adding together the base q-axis current command value (=Ia*) and a q-axis current compensation value that does not allow generation a torque ripple. The q-axis current compensation value corresponding to a given PWM cycle Tc is a value that depends on the rotor rotation angle θi and assist current value (base current command value) Ia* corresponding the given PWM cycle Tc. The q-axis current compensation value corresponding to a given PWM cycle Tc can be obtained from, for example, a map that is created in advance for each assist current value Ia* and in which the q-axis current compensation value is stored in advance for each rotor rotation angle. The current command value setting unit 42 sets, as the d-axis current command value $I_{di}^*$, a value obtained by adding together the base d-axis current command value (=0) and a d-axis current compensation value that does not allow generation of a torque ripple. The d-axis current compensation value corresponding to a given PWM cycle Tc is a value that depends on the rotor rotation angle θi and assist current value (base current command value) Ia* corresponding to the given PWM cycle Tc. The d-axis current compensation value corresponding to a given PWM cycle Tc can be obtained from, for example, a map that is created in advance for each assist current value Ia* and in which the d-axis current compensation value is stored in advance for each rotor rotation angle.

A q-axis current compensation value and a d-axis current compensation value may be calculated by the same method as that for a torque ripple compensating unit described in Japanese Unexamined Patent Application Publication No. 2004-328814 (JP 2004-328814 A). The two-phase current command value $I_{dqi}^*$ set by the current command value setting unit 42 is provided to the open-loop control unit 43. The open-loop control unit 43 calculates a two-phase voltage command value $V_{dqi}^*$ (i=1 to 10) for each rotor rotation angle θI, based on the d-axis current command value $I_{di}^*$ and q-axis current command value $I_{qi}^*$ for each rotor rotation angle θi (i=1 to 10) set by the current command value setting unit 42 and the rotor rotation speed (angular speed) ω calculated by the rotation speed calculating unit 50. A two-phase voltage command value $V_{dqi}^*$ is a command value of voltage that should be applied to the electric motor 18. The two-phase voltage command value $V_{dqi}^*$ (i=1 to 10) includes a d-axis voltage command value $V_{di}^*$ (i=1 to 10) and a q-axis voltage command value $V_{qi}^*$ (i=1 to 10).

Specifically, the open-loop control unit 43 calculates a d-axis voltage command value $V_{di}^*$ and a q-axis voltage command value $V_{qi}^*$, according to Motor Voltage Equations (2), (3).

$$V_{di}^* = (R+PL_d) \times I_{di}^* - \omega \cdot L_q \cdot I_{qi}^* \quad \text{Motor Voltage Equation (2)}$$

$$V_{qi}^* = (R+PL_q) \times I_{qi}^* + \omega \cdot L_d \cdot I_{di}^* + \omega \cdot \Phi \quad \text{Motor Voltage Equation (3)}$$

$V_{di}^*$: d-axis voltage command value
$V_{qi}^*$: q-axis voltage command value
$I_{di}^*$: d-axis current command value
$I_{qi}^*$: q-axis current command value
ω: rotor rotation speed
R: armature coil resistance
$L_d$: d-axis self-inductance
$L_q$: q-axis self-inductance
Φ: armature interlinkage magnetic flux (√3/2) times of the maximum value of the number of interlinkage magnetic fluxes of a U-phase armature coil, a V-phase armature coil, and a W-phase armature coil, where √(3/2) means the square root of (3/2))
P: differential operator (=d/dt)

In this case, the self-inductance $L_d$ of the d-axis and the self-inductance $L_q$ of the q-axis are set in advance. Further, initial values of the armature coil resistance R and the armature interlinkage magnetic flux Φ are set in advance. The value of the armature coil resistance R and the value of the armature interlinkage magnetic flux Φ vary depending on temperature variations. In the present embodiment, the open-loop control parameter compensating unit 44 is provided to compensate for the armature coil resistance R and the armature interlinkage magnetic flux Φ. The open-loop control unit 43 calculates a d-axis voltage command value $V_{di}^*$ and a q-axis voltage command value $V_{qi}^*$, based on the armature coil resistance R and the armature interlinkage magnetic flux Φ after the compensation by the open-loop control parameter compensating unit 44.

The open-loop control parameter compensating unit 44 calculates an armature coil resistance R and an armature interlinkage magnetic flux Φ, based on the d-axis detected current $I_d$ and q-axis detected current $I_q$ obtained by the three-phase-to-two-phase converting unit 48, the rotor rotation speed ω calculated by the rotation speed calculating unit 50, and the latest q-axis voltage command value $V_{qi}^*$ calculated by the open-loop control unit 43. Specifically, when the q-axis detected current $I_q$ is not zero ($I_q \neq 0$), the open-loop control parameter compensating unit 44 calculates an armature coil resistance R, according to Equation (4). Then, the value of the armature coil resistance R is updated.

$$R = (V_{qi}^* - PL_q \cdot I_q - \omega \cdot L_d \cdot I_d - \omega \cdot \Phi) / I_q \quad \text{Equation (4)}$$

$V_{qi}^*$: last calculated q-axis voltage command value
P: differential operator
$L_d$: d-axis self-inductance
$L_q$: q-axis self-inductance
$I_d$: d-axis detected current
$I_q$: q-axis detected current
ω: rotor rotation speed
Φ: armature interlinkage magnetic flux The open-loop control parameter compensating unit 44 may calculate a armature coil resistance R according to Equation (5) or Equation (6), instead of Equation (4).

$$R = (V_{qi}^* - \omega \cdot l_d \cdot I_d - \omega \cdot \Phi) / I_q \quad \text{Equation (5)}$$

$$R = (V_{qi}^* - \omega \cdot \Phi) / I_q \quad \text{Equation (6)}$$

When the rotation speed ω of the rotor is not zero (ω≠0), the open-loop control parameter compensating unit 44 calculates an armature interlinkage magnetic flux Φ, according to Equation (7). Then, the value of the armature interlinkage magnetic flux Φ is updated.

$$\Phi = (V_{qi}^* - (R+PL_q)I_q - \omega \cdot L_d \cdot I_d) / \omega \quad \text{Equation (7)}$$

$V_{qi}^*$: last calculated q-axis voltage command value
R: armature coil resistance
P: differential operator
$L_d$: d-axis self-inductance
$L_q$: q-axis self-inductance
$I_d$: d-axis detected current
$I_q$: q-axis detected current
ω: rotor rotation speed The open-loop control parameter compensating unit 44 may calculate an armature interlinkage magnetic flux Φ according to Equation (8) or Equation (9), instead of Equation (7).

$$\Phi = (V_{qi}^* - R \cdot I_q - \omega \cdot L_d \cdot I_d) / \omega \quad \text{Equation (8)}$$

$$\Phi = (V_{qi}^* - R \cdot I_q) / \omega \quad \text{Equation (9)}$$

The two-phase voltage command value $V_{dqi}^*$ (the d-axis voltage command value $V_{di}^*$ and the q-axis voltage command value $V_{qi}^*$) calculated for each rotor rotation angle θi by the open-loop control unit 43 is provided to the two-phase-to-three-phase converting unit 45.

The two-phase-to-three-phase converting unit 45 executes the two-phase-to-three-phase conversion on the two-phase voltage command value $V_{dqi}^*$ calculated in the present current control cycle Ta by the open-loop control unit 43, by using each of rotation angle estimates θ1 to θ10 for the next current control cycle Ta calculated by the rotation angle estimating unit 51 in the present current control cycle Ta. Thus, the two-phase-to-three-phase converting unit 45 calculates a three-phase voltage command value $V_{UVWi}^*$ (i=1 to 10) for each PWM cycle Tc included in the next current control cycle Ta. The three-phase voltage command value $V_{UVWi}^*$ (i=1 to 10) includes a U-phase voltage command value $V_{Ui}^*$ (i=1 to 10), a V-phase voltage command value $V_{Vi}^*$ (i=1 to 10), and a W-phase voltage command value $V_{Wi}^*$ (i=1 to 10). Thus, it is possible to obtain a three-phase voltage command value $V_{UVWi}^*$ for each PWM cycle Tc included in the next current control cycle Ta.

The three-phase voltage command value $V_{UVWi}^*$ for each PWM cycle Tc included in the next current control cycle Ta, which is obtained by the two-phase-to-three-phase converting unit 45, is provided to the PWM duty ratio calculating unit 46. The PWM duty ratio calculating unit 46 generates a U-phase PWM count (PWM duty ratio), a V-phase PWM count, and a W-phase PWM count for each PWM cycle Tc in the next current control cycle Ta, based on the three-phase voltage command value $V_{UVW\ i}^*$ for each PWM cycle Tc included in the next current control cycle Ta, which is obtained by the two-phase-to-three-phase converting unit 45. Then, the PWM duty ratio calculating unit 46 provides the U-phase PWM count, the V-phase PWM count, and the W-phase PWM count to the PWM output unit 47.

The PWM output unit 47 stores the U-phase PWM count, the V-phase PWM count, and the W-phase PWM count for each of the PWM cycles Tc in each of a plurality of the current control cycles Ta, which are provided from the PWM duty ratio calculating unit 46. The PWM output unit 47 generates a U-phase PWM signal, a V-phase PWM signal, and a W-phase PWM signal for each PWM cycle Tc in the present current control cycle Ta, based on the U-phase PWM count, the V-phase PWM count, and the W-phase PWM count for each PWM cycle Tc in the present current control cycle Ta, which are provided from the PWM duty ratio calculating unit 46 in the immediately preceding current control cycle Ta. Then, the PWM output unit 47 provides the U-phase PWM signal, the V-phase PWM signal, and the W-phase PWM signal to the drive circuit 32. Specifically, for each PWM cycle Tc in the present current control cycle Ta, the PWM output unit 47 generates a U-phase PWM signal, a V-phase PWM signal, and a W-phase PWM signal having duty ratios respectively corresponding to the U-phase PWM count, the V-phase PWM count, and the W-phase PWM count for a corresponding one of the PWM cycles Tc in the present current control cycle Ta. Then, the PWM output unit 47 provides the U-phase PWM signal, the V-phase PWM signal, and the W-phase PWM signal to the drive circuit 32.

The drive circuit 32 is a three-phase inverter circuit with the U-phase, the V-phase, and the W-phase. Power elements constituting the inverter circuit are controlled by the PWM signals provided from the PWM output unit 47. Thus, voltages corresponding to the three-phase voltage command value $V_{UVWi}^*$ for each PWM cycle Tc are applied to the U-phase stator coil 101, the V-phase stator coil 102, and the W-phase stator coil 103 of the electric motor 18.

In this way, the open-loop control of the electric motor 18 is executed based on the two-phase current command value $I_{dqi}^*$ set by the current command value setting unit 42. Thus, the current to be passed through the electric motor 18 is controlled based on the two-phase current command value $I_{dqi}^*$ set by the current command value setting unit 42, and the generation of a torque ripple is suppressed. In the present embodiment, a two-phase current command value $I_{dqi}^*$ is set for each of a plurality of PWM cycles Tc included in the current control cycle Ta, and a two-phase voltage command value $V_{dqi}^*$ corresponding to the two-phase current command value $I_{dqi}^*$ for each PWM cycle Tc is calculated through the open-loop control. Therefore, even when a plurality of PWM cycles Tc is included in the current control cycle Ta, it is possible to execute current control through which the two-phase current command value $I_{dqi}^*$ is varied for each PWM cycle Tc. Thus, even when a plurality of PWM cycles Tc is included in the current control cycle Ta, it is possible to execute motor control through which the two-phase current command value $I_{dqi}^*$ is varied for each PWM cycle based on the rotor rotation angle, as in the case of torque ripple compensation.

While the example embodiment of the invention has been described, the invention may be implemented in various other embodiments. For example, in the foregoing embodiment, the open-loop control parameter compensating unit 44 compensates for the armature coil resistance R and the armature interlinkage magnetic flux Φ, which are open-loop control parameters. However, such compensation need not be executed. In a case where the armature coil resistance R and the armature interlinkage magnetic flux Φ are compensated for as described above, the electric motor 18 may be controlled through feedback control, at the start time of the electric motor 18 when the accuracies of the armature coil resistance R and the armature interlinkage magnetic flux Φ are low. In this case, while the feedback control is executed, the control for varying the two-phase current command value $I_{dqi}^*$ based on the rotor rotation angle is not executed.

In the foregoing embodiment, the invention is applied to the motor control device of the electric power steering system. However, the invention may be applied to a motor control device that is used in a system other than the electric power steering system. In addition, various design changes may be made within the technical scope defined in the appended claims.

What is claimed is:

1. A motor control device configured to control an electric motor based on a pulse width modulation (PWM) signal generated for each PWM cycle of a plurality of PWM cycles included in a current control cycle, the current control cycle being a time period within which an assist current value is set based on a detected steering torque and a detected vehicle speed, and the time period of the current control cycle is greater than a time period of one PWM cycle of the plurality of PWM cycles, the motor control device comprising an electronic control unit configured to:
   estimate rotation angles of the electric motor for each PWM cycle of the plurality of PWM cycles in the current control cycle;
   set a two-phase current command value in a two-phase rotating coordinate system for each PWM cycle of the plurality of PWM cycles in the current control cycle;
   calculate a two-phase voltage command value for each PWM cycle of the plurality of PWM cycles, according to a set of motor voltage equations, based on the set two-phase current command value for each PWM cycle of the plurality of PWM cycles and a rotation speed of the electric motor, the two-phase voltage command value being a command value of voltage that is to be applied to the electric motor;

generate the PWM signal for each PWM cycle of the plurality of PWM cycles in a given current control cycle, based on the two-phase voltage command value generated for the given current control cycle and the estimated rotation angles of the electric motor for each PWM cycle of the plurality of PWM cycles in the given current control cycle; and execute current control by the PWM signal for each PWM cycle of the plurality of PWM cycles in the given current control cycle.

2. The motor control device according to claim 1, wherein the electronic control unit is configured to:

calculate a three-phase voltage command value in a three-phase fixed coordinate system for each PWM cycle of the plurality of PWM cycles in the given current control cycle, by executing two-phase-to-three-phase conversion on the two-phase voltage command value generated for the given current control cycle, based on the estimated rotation angles of the electric motor for each PWM cycle of the plurality of PWM cycles in the given current control cycle; and generate the PWM signal for each PWM cycle of the plurality of PWM cycles in the given current control cycle, based on the calculated three-phase voltage command value.

3. The motor control device according to claim 2, wherein the electronic control unit is configured to set the two-phase current command value for each PWM cycle of the plurality of PWM cycles in the given current control cycle, based on the estimated rotation angles of the electric motor for each PWM cycle of the plurality of PWM cycles in the given current control cycle.

4. The motor control device according to claim 2, wherein the electronic control unit is configured to set the two-phase current command value for each PWM cycle of the plurality of PWM cycles in the given current control cycle, based on a set base current command value for the given current control cycle and the estimated rotation angles of the electric motor for each PWM cycle of the plurality of PWM cycles in the given current control cycle, the two-phase current command value depending on the set base current command value and reducing a torque ripple.

5. The motor control device according to claim 1, wherein the electronic control unit is configured to set the two-phase current command value for each PWM cycle of the plurality of PWM cycles in the given current control cycle, based on the estimated rotation angles of the electric motor for each PWM cycle of the plurality of PWM cycles in the given current control cycle.

6. The motor control device according to claim 1, wherein the electronic control unit is configured to set the two-phase current command value for each PWM cycle of the plurality of PWM cycles in the given current control cycle, based on a set base current command value for the given current control cycle and the estimated rotation angles of the electric motor for each PWM cycle of the plurality of PWM cycles in the given current control cycle, the two-phase current command value depending on the set base current command value and reducing a torque ripple.

* * * * *